(12) United States Patent
Durin

(10) Patent No.: US 6,729,606 B1
(45) Date of Patent: May 4, 2004

(54) DEVICE FOR GUIDING AT LEAST A FLEXIBLE ELONGATED ELEMENT SUCH AS A CABLE OR THE LIKE, WITH SUBSTANTIALLY CLOSED CONTOUR

(75) Inventor: Michel Durin, Fontenay-le-Fleury (FR)

(73) Assignee: I.C.M. Group, Montbard (FR)

( * ) Notice: Subject to any disclaimer, the term of this patent is extended or adjusted under 35 U.S.C. 154(b) by 0 days.

(21) Appl. No.: 10/049,237
(22) PCT Filed: Aug. 8, 2000
(86) PCT No.: PCT/FR00/02275
§ 371 (c)(1), (2), (4) Date: Feb. 11, 2002
(87) PCT Pub. No.: WO01/11742
PCT Pub. Date: Feb. 15, 2001

(30) Foreign Application Priority Data

Aug. 10, 1999 (FR) ............................................ 99 10361

(51) Int. Cl.⁷ ................................................. B66D 3/08
(52) U.S. Cl. ..................... 254/395; 254/396; 242/615.2
(58) Field of Search ......................... 242/615.2, 615.3, 242/397.5; 254/395, 396, 134.3 R, 134.3 PA

(56) References Cited

U.S. PATENT DOCUMENTS

| 16,992 | A | * | 4/1857 | Osgood | 254/134.3 R |
|---|---|---|---|---|---|
| 298,241 | A | * | 5/1884 | Schneider | 254/134.3 R |
| 458,855 | A | * | 9/1891 | Meinzer | 254/395 |
| 522,524 | A | * | 7/1894 | Hook | 114/101 |
| 1,525,837 | A | * | 2/1925 | Walker et al. | 242/157 R |
| 1,599,666 | A | * | 9/1926 | Manley | 254/395 |
| 2,422,353 | A | * | 6/1947 | Hitt | 242/157 R |
| 2,483,760 | A | * | 10/1949 | Duncan | 254/395 |
| 2,816,734 | A | * | 12/1957 | Crofoot | 242/615.2 |
| 2,946,559 | A | * | 7/1960 | Pickett | 254/134.3 PA |
| 3,070,355 | A | * | 12/1962 | Wyatt | 254/134.3 R |
| 4,246,675 | A | * | 1/1981 | Costanzo | 15/315 |
| 4,327,897 | A | * | 5/1982 | Smith | 254/395 |
| 4,479,453 | A | * | 10/1984 | Bonassi | 114/218 |
| 4,690,381 | A | * | 9/1987 | Asai | 254/394 |

FOREIGN PATENT DOCUMENTS

| JP | 02179205 A | * | 7/1990 | H02G/1/06 |
|---|---|---|---|---|
| JP | 04289614 A | * | 10/1992 | H01B/13/00 |

\* cited by examiner

Primary Examiner—Kathy Matecki
Assistant Examiner—Sang Kim
(74) Attorney, Agent, or Firm—Young & Thompson

(57) ABSTRACT

A device for guiding a flexible elongated element such as a cable or the like, designed to guide the element during a drawing process, and comprising several rollers mounted pivoting about an axis and arranged such that they define a space for receiving the element and whereof the contour is substantially closed, the shafts of the rollers being borne by a support capable of opening into two parts whereof one is mounted articulated relative to the other; a first part is a bent flat iron such that it is formed by three abutted U-shaped brackets, two brackets being arranged facing each other and coupled each with the end of the wing of the other bracket whereof the web extends perpendicular to the parallel webs of the two brackets and the second part is a flat iron bent so as to form a bracket similar to the brackets of the first part but whereof the ends of the wings, not coupled to the web of the U-shaped bracket, are prolonged along two lugs extending outwards of the U parallel to the U web.

12 Claims, 4 Drawing Sheets

DEVICE FOR GUIDING AT LEAST A FLEXIBLE ELONGATED ELEMENT SUCH AS A CABLE OR THE LIKE, WITH SUBSTANTIALLY CLOSED CONTOUR The present invention relates to a device for guiding at least one flexible elongate member.

The expression "flexible elongate member" means a member of great length, often supplied on spools and installed by paying it out from a spool.

Examples of a flexible elongate member of this kind are an electrical or similar cable or a tube, for example an instrumentation or fluid transport tube; the term "electrical cable" means not only a cable adapted to transport and distribute electrical power but also a cable or a fiber adapted to transmit information electrically, optically or otherwise.

Cables are frequently referred to hereinafter to facilitate the description, but of course anything stated in connection with cables is valid for any kind of flexible elongate member.

The cable drawing operation is generally carried out to install the cable in its place of use.

It is rare for the installed cable to be entirely straight. It has to follow an installation route that often includes bends and/or changes of level.

Cable guide devices for guiding the cable during the cable drawing operation have already been proposed; such guide devices generally include one or more rollers rotating about a shaft disposed transversely to the direction in which the drawn cable moves.

The document FR-A-2 664 441 proposes a device for guiding at least one flexible elongate member such as a cable or the like, adapted to guide said member during a drawing operation carried out to install it, for example, and including a plurality of rollers rotatable about a shaft adapted to be disposed transversely to the direction of movement of the drawn member and disposed so that they define a space adapted to receive said member and whose contour generally transversely to said direction of movement is substantially closed, the shafts of the rollers being carried by a closed but openable two-part support, one part of which is articulated to the other part.

The above kind of guide device can draw the cable in all directions.

An object of the present invention is to propose a guide device of the above type that is simple and easy to produce.

In accordance with the invention a device for guiding at least one flexible elongate member such as a cable or the like, adapted to guide said member during a drawing operation carried out to install it, for example, and including a plurality of rollers rotatable about a shaft adapted to be disposed transversely to the direction of movement of the drawn member and disposed so that they define a space adapted to receive said member and whose contour generally transversely to said direction of movement is substantially closed, the shafts of the rollers being carried by a closed but openable two-part support, one part of which is articulated to the other part, is characterized in that a first part is a flat strip bent to a shape consisting of three butt-jointed U-shaped brackets, two brackets being disposed face to face and each connected to the end of a flange of the remaining bracket, whose web is perpendicular to the parallel webs of said two brackets, and the second part is a flat strip bent to form a bracket similar to the brackets of the first part but in which the ends of the flanges not joined to the web of the U-shaped bracket are extended by two lugs extending toward the outside of the U-shape in a direction parallel to the web of said U-shape.

Each of the brackets of the support preferably receives a roller freely rotatable about a shaft carried by the flanges of each bracket of the support and parallel to its web.

The shafts are advantageously retained axially by, at one end, a head that they have at one end and, at the other end, by deforming their other end to form two stop lugs to prevent axial movement, for example, extending radially beyond the diameter of a hole formed in the corresponding flange of the U-shape and through which the shaft passes.

The shafts associated with the brackets of the first part that face each other are preferably used to fasten together the two parts of the support so that the two lugs of the second part are held pressed against the outside face of the free flanges of said brackets of the first part.

The shafts of the rollers are advantageously in substantially the same plane.

The rollers are preferably all identical and their shafts preferably are disposed along the sides of a square.

The two parts advantageously carry locking means for locking the support in a closed configuration.

The locking means are preferably hook-like; the hook preferably cooperates with an end provided with a head of the shaft of a roller.

The support is advantageously locked elastically in its closed configuration by an elastic part of the support that carries the hook.

The contour of the space adapted to receive at least one elongate member is preferably circular.

The outside peripheral surface of the rollers advantageously has a toroidal portion.

The ends of the rollers are preferably such that there is virtually no gap between the rollers.

The support advantageously includes at least one slot for fixing it to a support member.

The outside peripheral surface of the rollers is preferably of at least two sharply contrasting colors.

To explain the subject matter of the invention better, an embodiment of the invention shown in the accompanying drawings is described next by way of purely illustrative and non-limiting example.

In the drawings:

FIGS. 1 and 2 show a guide device 10 in accordance with the invention.

Figure 1:
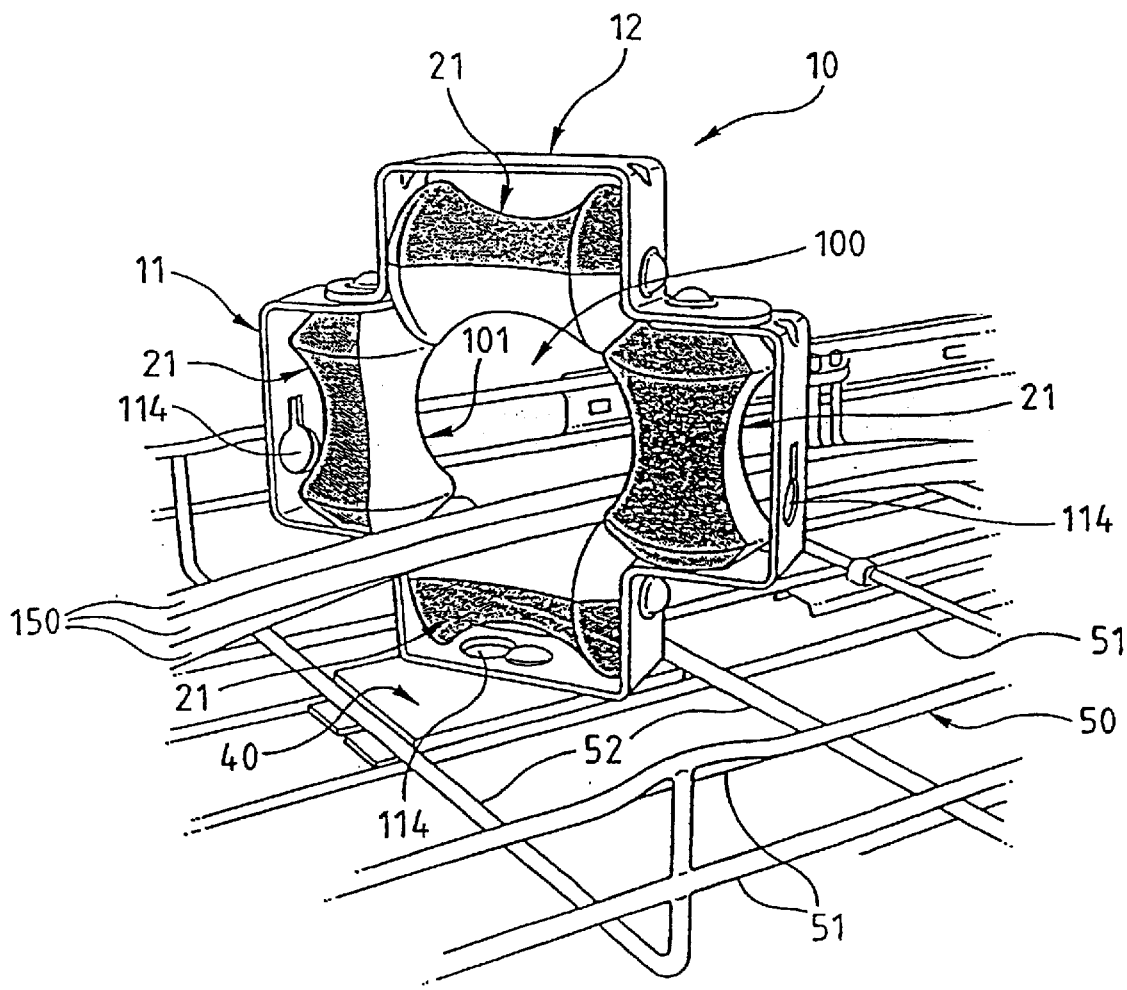
FIG. 1 is a perspective view of a guide device according to the invention fixed to a wire cable tray.

Here the guide device 10 is used to install cables 150 in a cable tray 50.

In the embodiment shown, the cable tray 50 is a wire cable tray in the form of a wire mesh made up of two different types of wires, namely, on the one hand, longitudinal wires 51, usually called the warp wires, which run longitudinally and straight or virtually over their whole length, and, on the other hand, disposed transversely from place to place along the longitudinal wires 51, and appropriately attached thereto, U-shaped transverse wires 52, usually referred to as weft wires, the combination globally forming three panels, which are in practice flat or substantially flat, namely a bottom panel and two lateral panels.

The guide device 10 can also be used to install cables in a sheet metal cable tray, not shown, of a type known in the art.

Wire and sheet metal cable trays are routinely used, like troughs, to support, house and protect cables such as the cables 150.

The guide device 10 consists of a support 11–12 supporting rollers 21, in this case four rollers 21.

The support 11–12 is in two parts, comprising a first part 11 and a second part 12.

The first part 11 is flat strip bent so that it is globally U-shaped; to be more precise, it consists of three butt-jointed U-shaped brackets 111, 112, 113; the two brackets 111 and 113 are disposed face to face and each is connected to the end of a flange of the bracket 112, whose web is perpendicular to the parallel webs of the brackets 111 and 113.

The second part 12 is a flat strip similar to the flat strip of the first part 11, bent to form a U-shaped bracket similar to the brackets 111, 112, 113, but with the ends of the flanges not joined to the web of the bracket extended by two lugs 121, 122 extending toward the outside of the U-shape in a direction parallel to the web of said U-shape.

Each of the support brackets 11–12 receives a roller 21 freely rotatable about a shaft 30 carried by the flanges of each bracket of the support 11–12 and parallel to its web; the shafts 30 are retained axially by, at one end, a head 31 that they have at one end and, at the other end, by deforming their other end 32 to form, for example, two stop lugs to prevent axial movement, extending radially beyond the diameter of a hole formed in the corresponding flange of the U-shape and through which the shaft 30 passes.

Here, the shafts 30 associated with the brackets 111 and 113 are used to fasten together the two parts 11 and 12 of the support so that the two lugs 121, 122 of the second part 12 are pressed against the outside faces of the free flanges of the brackets 111 and 113 of the first part 11.

Each roller 21, which is made of a plastics material, for example, is naturally circular and has a central portion 22 flanked by two end portions 23, 24; the central portion 22 is diabolo-shaped: to be more precise, its generatrix is a circular arc subtending an angle of 90 degrees, and the central portion 22 is therefore of toroidal shape; each end portion 23, 24 is frustoconical, the apex of each cone is outside the flanges of the bracket of the support receiving the roller 21, and the generatrices of each truncated cone are inclined at 45 degrees to its base.

Figure 2:
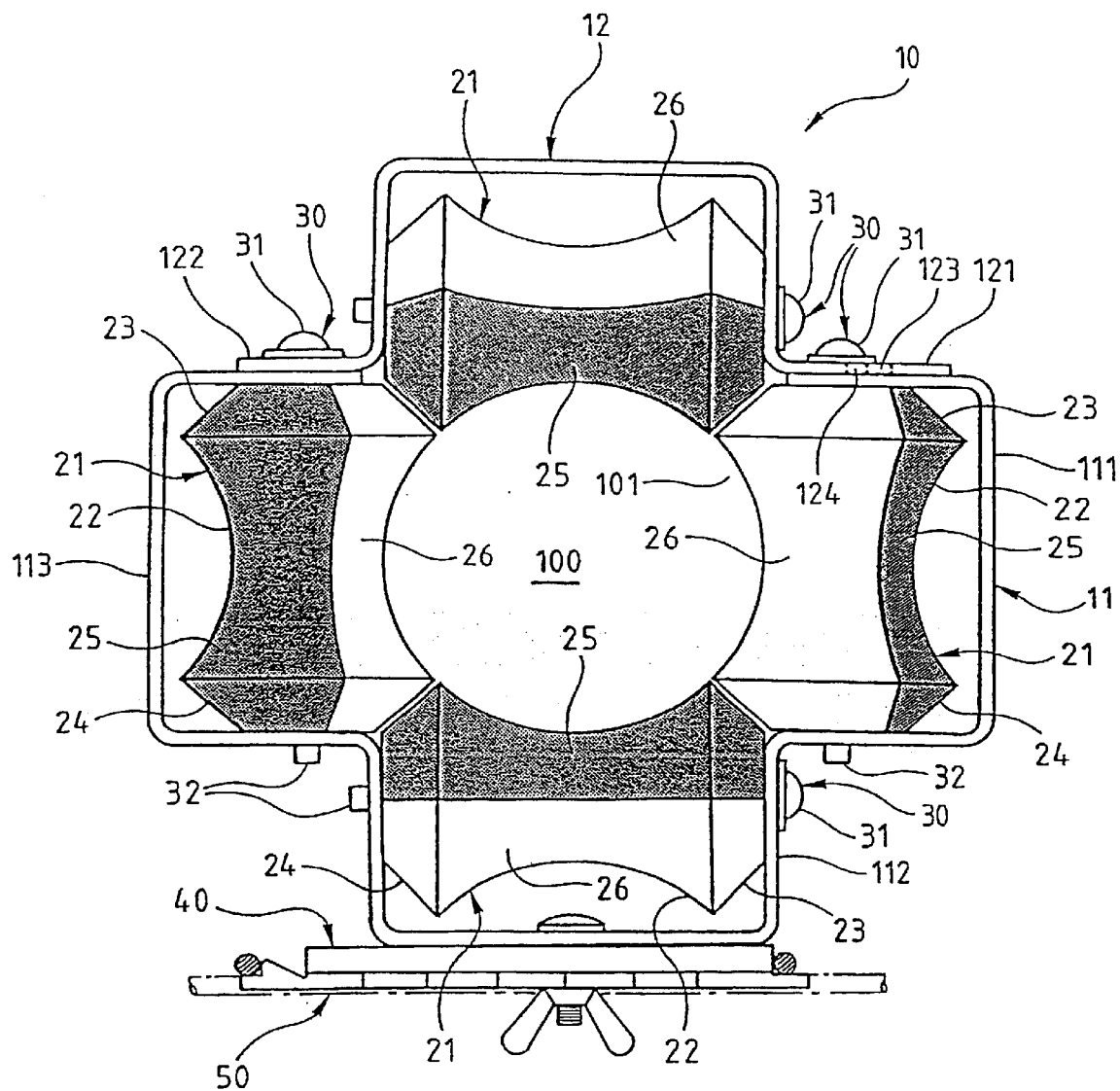
FIG. 2 is a front view of the guide device shown in FIG. 1.

As can be seen in FIG. 2 in particular, when the device is assembled the four rollers 21 define a substantially closed internal space 100 which has a circular contour 101 and is intended to receive the cable or cables to be installed; there remain only very small gaps between two adjacent rollers 21, which correspond to a functional clearance enabling the rollers to rotate freely relative to each other; the gap is in any event very much smaller than the diameter of the cable to be installed.

Obviously, using the invention, it is possible to draw a cable through the space 100 in any direction, in particular (as shown in FIG. 2) upward, downward, toward the left or toward the right, one of the rollers 21 being always available for each of these directions.

Figure 6:
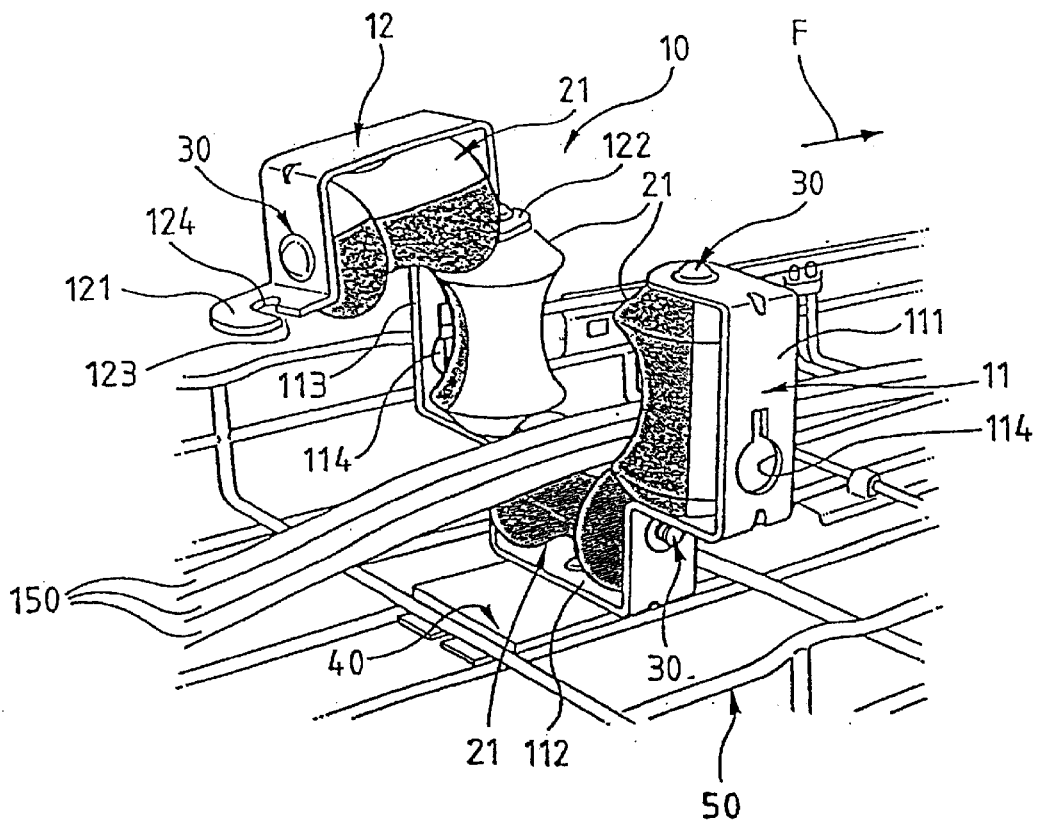
FIG. 6 is similar to FIG. 1 and shows the guide device according to the invention "opened" to insert cables before drawing the cables.

To facilitate inserting the cables 150 into the space 100 before drawing them, the support 11–12 of the guide device 10 is preferably openable; here, the lug 121 of the second part 12 is conformed as a hook by means of a transverse cut-out 123 (see FIG. 6) opening into a longitudinal oblong opening 124; the width of the cut-out 123 and the oblong opening 124, which is thus perpendicular to the cut-out 123, is only very slightly greater than the diameter of the body of a shaft 30; accordingly, from the open position of the support 11–12 shown in FIG. 6, it suffices to pivot the second part 12 of the support 11–12 about the shaft that passes through its lug 122, to move its lug 121 onto the free flange of the bracket 111 of the first part 11 and under the head of the corresponding shaft 30; the closed support 11–12 is locked when the body of the shaft 30 has passed through the cut-out 123 and takes up its position in the end of the oblong opening 124 close to the flange of the bracket of the second part 12. To be sure that this has occurred, and therefore to ensure safe locking, the webs of the brackets 111 and 113 when at rest at not strictly parallel, but instead inclined slightly toward each other and the brackets 111 and 113 are spread apart to fit the cut-out 123 under the head of the shaft 30 of the bracket 111; when the end of the cut-out 123 is positioned correctly, they move back elastically toward each other, which places the body of the shaft 30 at the end of the oblong opening 124 and elastically ensures safe locking.

Be this as it may, to be sure that the support 11–12 cannot open when drawing cables, it suffices to position the guide device 10 so that the cables are drawn in the direction of the arrow F (FIG. 6).

Figure 4:
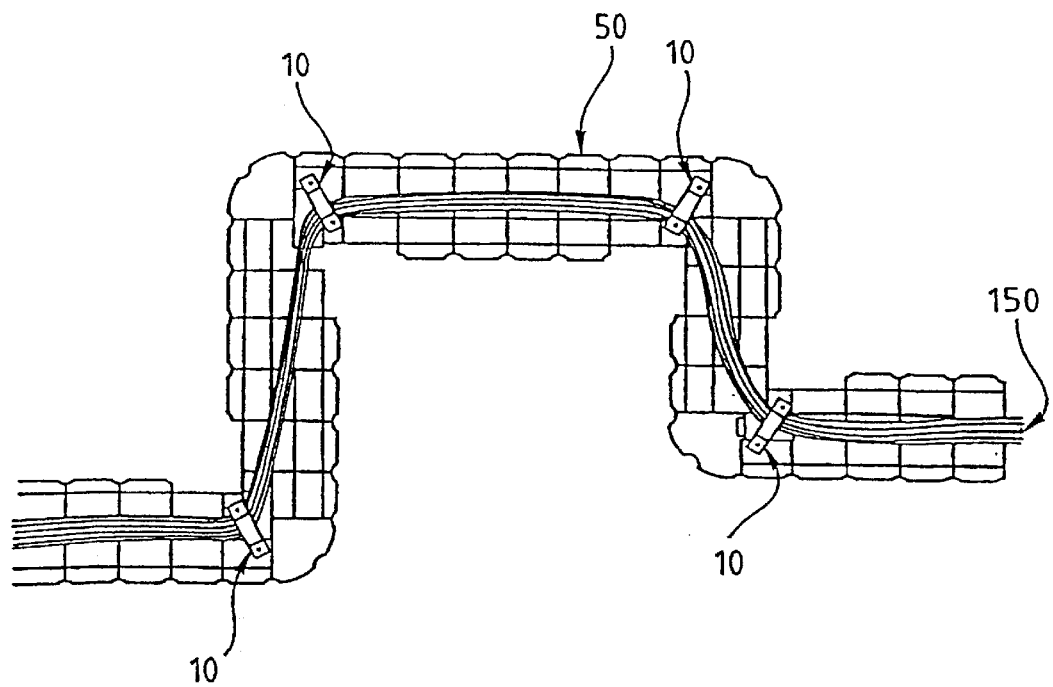
FIG. 4 is a plan viewing showing the use of guide devices according to the invention to install cables in a cable tray portion that is not straight.

Continuing with the example of application of the guide device 10 to installing cables 150 in a wire cable tray 50, FIG. 4 is a plan view of a wire cable tray including four bends, here right-angle bends; it can be seen that it is easy to draw the cables 150 because of the guide device 10 in accordance with the invention installed at each bend.

Figure 5:
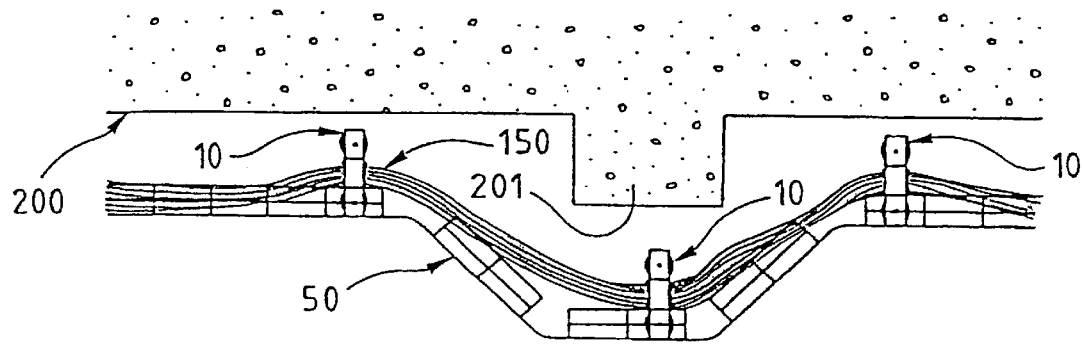
FIG. 5 is similar to FIG. 4 and shows the use of guide devices according to the invention to install cables in a cable tray portion that includes a change of level.

In side view (FIG. 5) the cable tray 50 has a shape enabling it to circumvent an obstacle 201, such as a beam projecting from a ceiling 200. Once again, the three guide devices 10 placed as shown enable the cables 150 to be drawn easily despite the change of level.

As shown, the outside surface of the rollers 21 includes two areas 25, 26 on respective opposite sides of a plane passing through the axis of the rollers 21; the two areas 25, 26 are different and sharply contrasting colors; here the area 25 is black and the area 26 is white; two different colors can of course be used, provided that they are sharply contrasting; by virtue of this feature, the operator drawing the cables 150 is able to see, even from far away, that the rollers 21 are rotating and not jammed, which would entail the risk not only of increasing the drawing force but also of damaging the cables by rubbing.

The webs of the brackets 111, 112, 113 of the first part of the support 11–12 include a slot 114 for fixing the guide device 10 to a support member.

In the example described and shown here the support member is the cable tray 50 itself; a fixing accessory 40 is provided that includes attachment means for fastening it to one of the panels of the cable tray 50, here the bottom panel.

When used with a sheet metal cable tray, the guide device 10 can be fixed directly to the cable tray by bolting it to a panel thereof without requiring fixing accessories.

Figure 3:
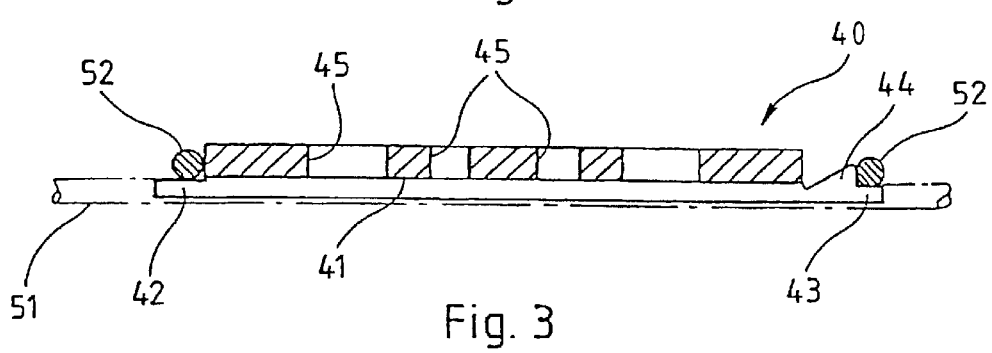
FIG. 3 is a part-sectional view of a fixing accessory used to fix the guide device to the wire cable tray.

The fixing accessory 40 is of the kind described in the document WO 99/06746, which should be referred to for more details. The fixing accessory 40 takes the form of a globally rectangular plate including, on the one hand (see FIG. 3), a groove 41 in its bottom surface adapted to receive a longitudinal wire 51 of the cable tray 50 and, on the other hand, lugs 42, 43, of which the lug 43 includes a transversely projecting clipping bead 44; the lugs 42, 43 engage under two adjoining transverse wires 52, the dimensions of the fixing accessory 40 being determined accordingly.

Thus the fixing accessory 40 is held in place relative to the cable tray 50. It incorporates various holes 45, one of which is used to fasten the support 11–12, and therefore the device 10, to the fixing accessory 40 by means of a nut and bolt fastener.

Figure 7:
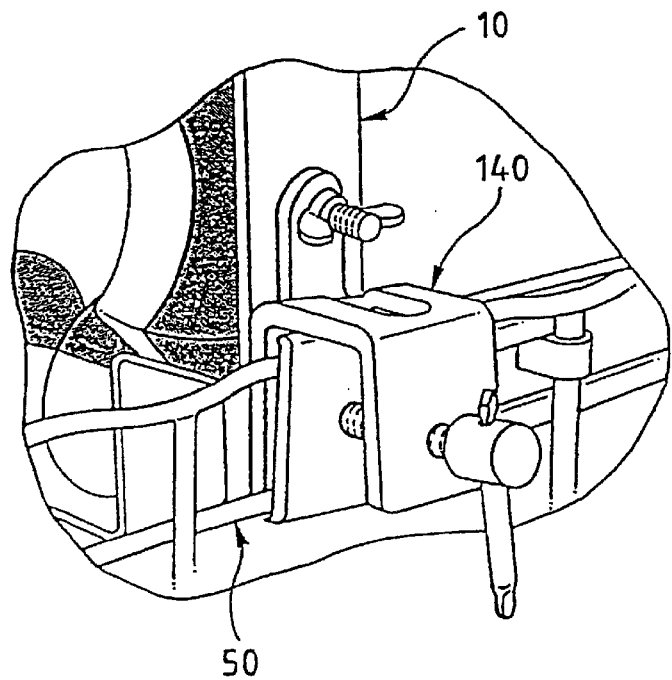
FIG. 7 is a partial view showing a variant fixing accessory, here in the form of vise means.

Other types of fixing accessory can be used, for example that described in the document FR-A-2 796 121, or vice means such as the vice means 140 shown in the FIG. 7 partial view.

The vise means 140 can be used to fix the guide device to a pair of wires, as shown in FIG. 7, or to a lateral panel of a sheet metal cable tray, or to a cable tray support bracket.

It is therefore possible to mount the guide device 10 in any position on a cable tray, of any type.

What is claimed is:

1. A device for guiding at least one flexible elongate member, adapted to guide said member during a drawing operation and including a plurality of rollers (21) rotatable about shafts (30) adapted to be disposed transversely to the direction of movement of the drawn member and disposed so that they define a space (100) adapted to receive said member and whose contour (101) generally transversely to said direction of movement is substantially closed, the shafts (30) of the rollers (21) being carried by a closed but openable two-part support (11–12), one part (12) of which is articulated to an other part (11), characterized in that said other part (11) is a flat strip bent to a shape consisting of three butt-jointed U-shaped brackets (111, 112, 113), two brackets (111, 113) being disposed face to face with a spacing between them and each connected to the end of a flange of the third bracket (112), and said one part (12) is a flat strip bent to form a fourth U-shaped bracket similar to the brackets (111, 112, 113) of the other part (11) but in which the ends of the flanges not joined to the web of the U-shaped bracket are each extended by two lugs (121, 122) extending toward the outside of the U-shape in a direction parallel to the web of said U-shape, the two lugs carrying locking means for locking the support (11–12) in a closed configuration, the locking means being a hook (123–124), the support (11–12) being elastically deformable to alter said spacing thereby to be locked elastically in its closed configuration by elasticity of said other part (11).

2. A guide device according to claim 1, characterized in that each of the brackets of the support (11–12) receives one of said rollers (21) freely rotatable about one of said shafts (30) carried by the flanges of each bracket of the support (11–12) and parallel to its web.

3. A guide device according to claim 2, characterized in that the shafts (30) are retained axially by, at one end, a head (31) that they have at one end and, at the other end, by deforming their other end (32) to form two stop lugs to prevent axial movement, extending radially beyond the diameter of a hole formed in the corresponding flange of the U-shape and through which the shaft (30) passes.

4. A guide device according to claim 1, characterized in that the shafts (30) associated with the brackets (111 and 113) of the other part (11) that face each other are used to fasten together the two parts (11, 12) of the support so that the two lugs (121, 122) of said one part (12) are held pressed against the outside face of the free flanges of said brackets (111, 112) of the other part (11).

5. A guide device according to claim 4, characterized in that the outside peripheral surface of the rollers (21) has a toroidal portion (22).

6. A guide device according to claim 5, characterized in that the ends (23, 24) of the rollers (21) are shaped such that there is virtually no gap between the rollers (21).

7. A guide device according to claim 1, characterized in that the shafts (30) of the rollers (21) are in substantially the same plane.

8. A guide device according to claim 7, characterized in that the support (11–12) includes at least one slot (114) for fixing it to a support member.

9. A guide device according to claim 1, characterized in that the rollers (21) are all identical and their shafts (30) are disposed along the sides of a square.

10. A guide device according to claim 1, characterized in that the hook (123–124) cooperates with an end provided with a head (31) of the shaft (30) of said roller (21).

11. A guide device according to claim 1, characterized in that the contour (101) is circular.

12. A guide device according to claim 1, characterized in that the outside peripheral surface of the rollers (21) is of at least two sharply contrasting colors (25, 26).

* * * * *